US012647941B2

(12) United States Patent
Zou

(10) Patent No.: US 12,647,941 B2
(45) Date of Patent: Jun. 2, 2026

(54) COMMUNICATION PROCESSING METHOD AND ELECTRONIC DEVICE

(71) Applicant: Beijing X-Ring Technology Co., Ltd., Beijing (CN)

(72) Inventor: Xu Zou, Shanghai (CN)

(73) Assignee: Beijing X-Ring Technology Co., Ltd., Beijing (CN)

( * ) Notice: Subject to any disclaimer, the term of this patent is extended or adjusted under 35 U.S.C. 154(b) by 341 days.

(21) Appl. No.: 18/372,007

(22) Filed: Sep. 22, 2023

(65) Prior Publication Data

US 2024/0414691 A1     Dec. 12, 2024

(30) Foreign Application Priority Data

Jun. 12, 2023     (CN) ......................... 202310694516.X

(51) Int. Cl.
H04W 68/02          (2009.01)
H04W 76/28          (2018.01)

(52) U.S. Cl.
CPC ........... H04W 68/02 (2013.01); H04W 76/28 (2018.02)

(58) Field of Classification Search
None
See application file for complete search history.

(56) References Cited

U.S. PATENT DOCUMENTS

| | | | | | |
|---|---|---|---|---|---|
| 2013/0114484 | A1* | 5/2013 | Suzuki | ................ | H04W 68/025 370/329 |
| 2015/0365894 | A1* | 12/2015 | Bai | ....................... | H04L 1/1854 370/311 |
| 2023/0171843 | A1 | 6/2023 | Luo et al. | | |

FOREIGN PATENT DOCUMENTS

| | | |
|---|---|---|
| KR | 20140103490 A | 8/2014 |
| WO | WO 2022145964 A1 | 7/2022 |

OTHER PUBLICATIONS

European Patent Application No. 23205431.2 Search Report dated Apr. 11, 2024, 8 pages.

* cited by examiner

*Primary Examiner* — Frantz Bataille
(74) *Attorney, Agent, or Firm* — Cozen O'Connor

(57) ABSTRACT

A communication processing method includes obtaining discontinuous reception (DRX) related parameter information of a terminal device; determining a location of an On-Duration in a DRX cycle according to the DRX related parameter information; and determining a paging occasion (PO) location of the terminal device based on the location of the On-Duration.

15 Claims, 3 Drawing Sheets obtaining DRX related parameter information of a terminal device ⟋ 101 determining a location of an On-Duration in a DRX cycle according to the DRX related parameter information ⟋ 102 determining a PO location of the terminal device based on the location of the On-Duration location ⟋ 103

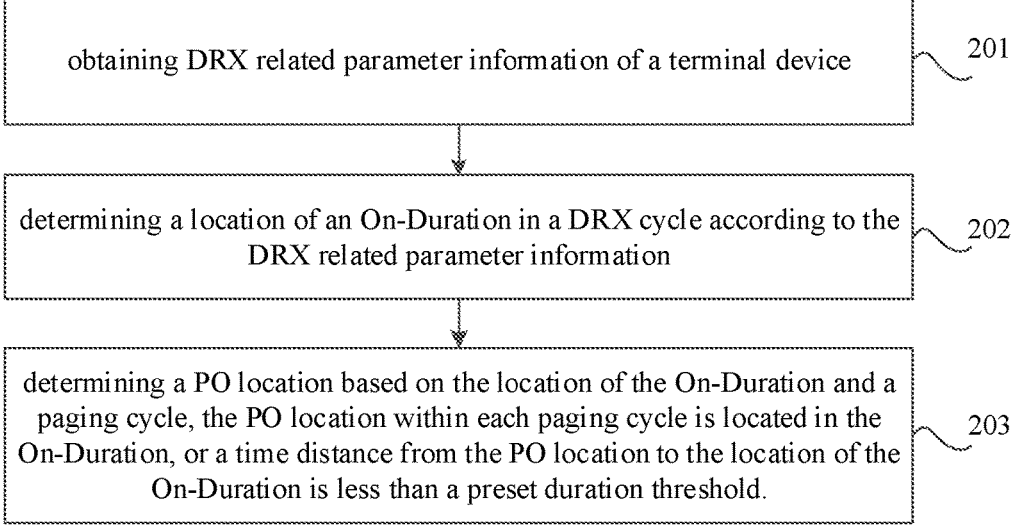

obtaining DRX related parameter information of a terminal device — 201 determining a location of an On-Duration in a DRX cycle according to the DRX related parameter information — 202 determining a PO location based on the location of the On-Duration and a paging cycle, the PO location within each paging cycle is located in the On-Duration, or a time distance from the PO location to the location of the On-Duration is less than a preset duration threshold. — 203

FIG. 4

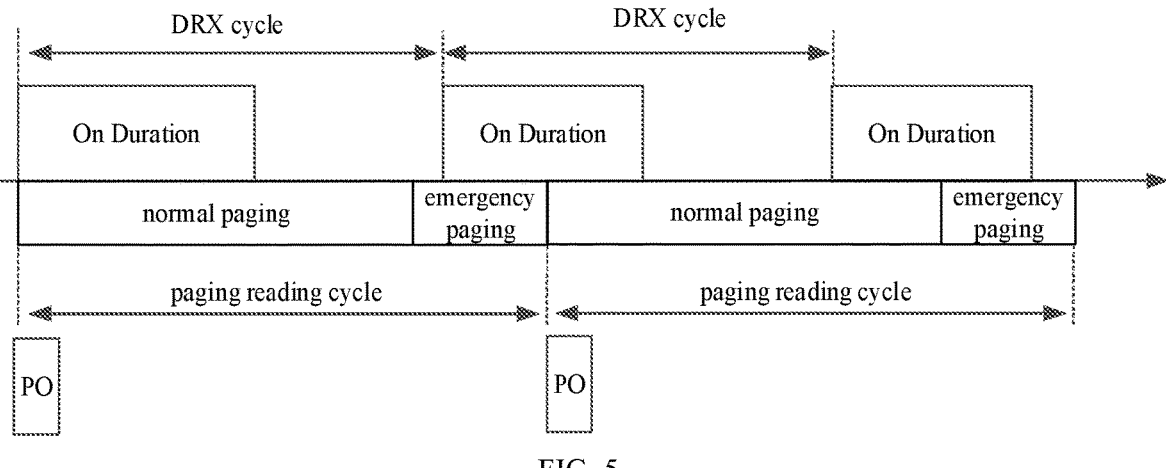

FIG. 5

COMMUNICATION PROCESSING METHOD AND ELECTRONIC DEVICE

CROSS-REFERENCE TO RELATED APPLICATION

This application claims priority to and benefits of Chinese Patent Application Serial No. 202310694516.X, filed on Jun. 12, 2023, the entire content of which is incorporated herein by reference.

TECHNICAL FIELD

The disclosure relates to a field of communication technology, in particular to a communication processing method and an electronic device.

SUMMARY

When a terminal device is in a New Radio (NR) connected mode and in a Small Data Transmission (SDT) process, a paging occasion (PO) is determined in accordance with a user equipment identity (UE-ID) for paging reception.

According to a first aspect of the disclosure, a communication processing method is provided. The method includes: obtaining DRX related parameter information of a terminal device; determining a location of an On-Duration in a DRX cycle according to the DRX related parameter information; and determining a PO location of the terminal device based on the location of the On-Duration.

According to a second aspect of the disclosure, a computer-readable storage medium having computer programs stored thereon is provided. When the computer programs are executed by a processor, the method of the first aspect is implemented.

According to a third aspect of the disclosure, an electronic device, including a storage medium, a processor and computer programs stored on the storage medium and executable on the processor, is provided. When the computer programs are executed by the processor, the method of the first aspect is implemented.

The above description is only an overview of the technical solution of the disclosure, in order to be able to more clearly understand the technical means of the disclosure, which can be implemented in accordance with the contents of the specification, and to make the above and additional purposes, features and advantages of the disclosure more clear and easy to understand, specific implementations are illustrated below in the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

In order to more clearly illustrate the technical solutions in the embodiments of the disclosure or in the related art, the accompanying drawings used in the description of the embodiments or in the related art will be briefly described below. It will be apparent to those skilled in the art that other accompanying drawings can be obtained according to these accompanying drawings without inventive works.

FIG. 4 illustrates a flowchart of a communication processing method according to an embodiment of the disclosure.

FIG. 5 illustrates a schematic diagram of an example according to an embodiment of the disclosure.

DETAILED DESCRIPTION

Embodiments of the disclosure will be described in detail below with reference to the accompanying drawings. It should be noted that the embodiments and features in the embodiments of the disclosure can be combined with each other without conflict.

In the related art, a terminal device in a New Radio (NR) connected mode and in a Small Data Transmission (SDT) process generally determines a paging occasion (PO) in accordance with a user equipment identity (UE-ID) for paging reception.

However, a PO location may fall into an inactive duration of discontinuous reception (DRX), which may interrupt the ongoing sleep of the terminal device, and the terminal device may be woken up for paging monitoring, thus additional power consumption of the terminal device may be increased.

Figure 1:
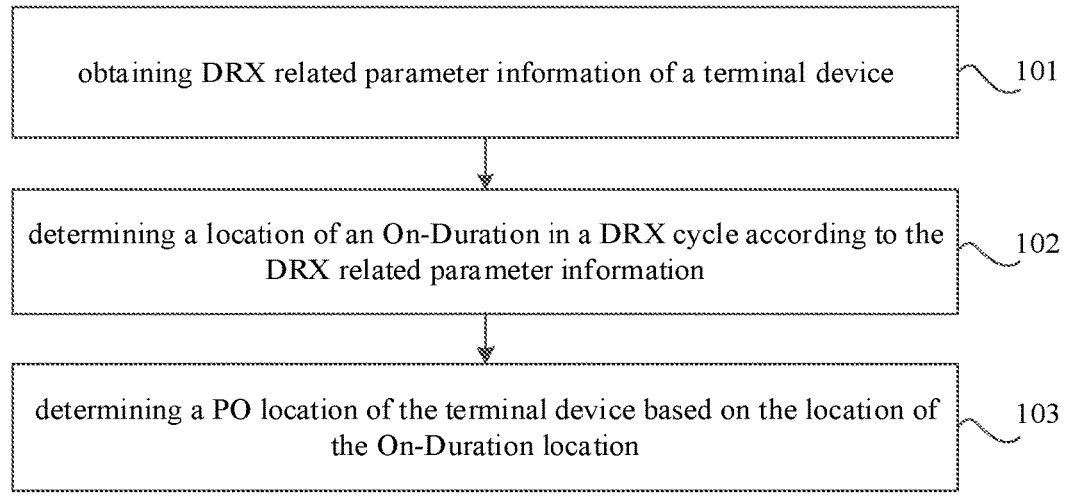
FIG. 1 illustrates a flowchart of a communication processing method according to an embodiment of the disclosure.

In order to improve the above technical problems, the embodiment provides a communication processing method. As illustrated in FIG. 1, the method includes the following steps.

At step 101, DRX related parameter information of a terminal device is obtained.

In some examples, the method shown in the disclosure may be performed by a terminal device. The terminal device may be referred to as a terminal, a use equipment (UE), a mobile station (MS), a mobile terminal (MT), and the like. The terminal device can also be a car with communication functions, a smart car, a mobile phone, a wearable device, a Pad, a computer with wireless transceiver functions, a virtual reality (VR) device, an augmented reality (AR) device, a wireless terminal device in industrial control, a wireless terminal device in self-driving, a wireless terminal device in remote medical surgery, a wireless terminal device in a smart grid, a wireless terminal device in transportation safety, a wireless terminal device in smart city, a wireless terminal device in smart home, etc. The specific technology and a specific device form adopted by the terminal device are not limited in the embodiments of the disclosure.

In an implementation of the disclosure, the terminal device is in a radio resource control (RRC) connected state (RRC_CONNECTED) when it performs the method of the disclosure.

DRX refers to an operating mode that saves power consumption of the terminal by turning on a receiver to enter into an activated state for receiving downlink data during a necessary time period and turning off the receiver to enter into a sleep state to stop receiving the downlink data during the remaining time periods.

In an embodiment of the disclosure, the DRX related parameter information of the terminal device may include: a starting time point of the DRX, and information related to a DRX cycle, etc. In a connected-state DRX operating mode, the terminal device does not always turn off the receiver, but may periodically turn on the receiver and starts to continuously listen to possible incoming signaling for a period of time thereafter, and this period of time is called an On-Duration. Thus, the DRX cycle can be classified into On-Duration and SLEEP according to behaviors of the terminal device.

At step 102, a location of an On-Duration in a DRX cycle is determined according to the DRX related parameter information.

The location of the On-Duration may be a time-domain location, including a location of a start time unit of the On-Duration and locations of individual time units within the On-Duration.

At step 103, a PO location of the terminal device is determined based on the location of the On-Duration.

The PO location may be a time-domain location of the PO. That is, the terminal device may determine when to perform paging monitoring based on the PO location. In the embodiment, the PO location of the terminal device may be determined based on the location of the On-Duration, so that the PO location of the terminal device can be kept within the On-Duration or can be as close as possible to the location of the On-Duration, i.e., to keep the PO location falling into the On-Duration of the DRX as much as possible. The terminal device can perform paging monitoring at the corresponding time according to the PO location.

Figure 2:
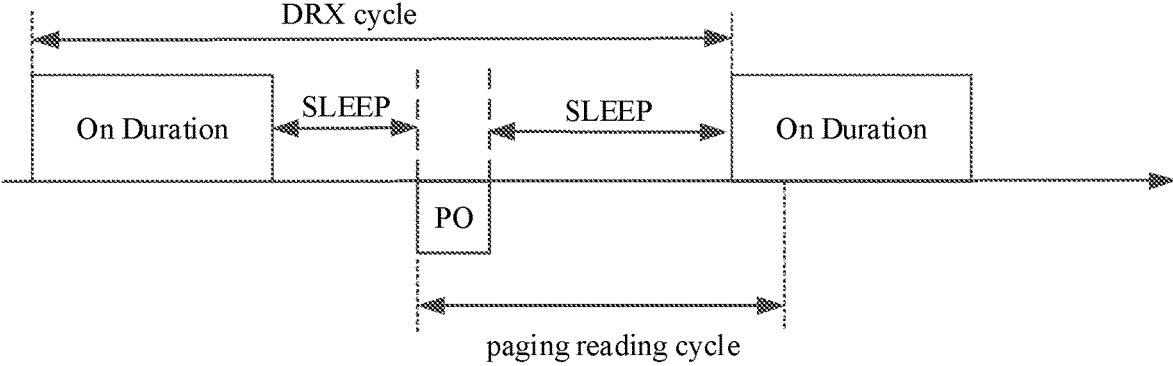
FIG. 2 illustrates a schematic diagram of an example according to an embodiment of the disclosure.
Figure 3:
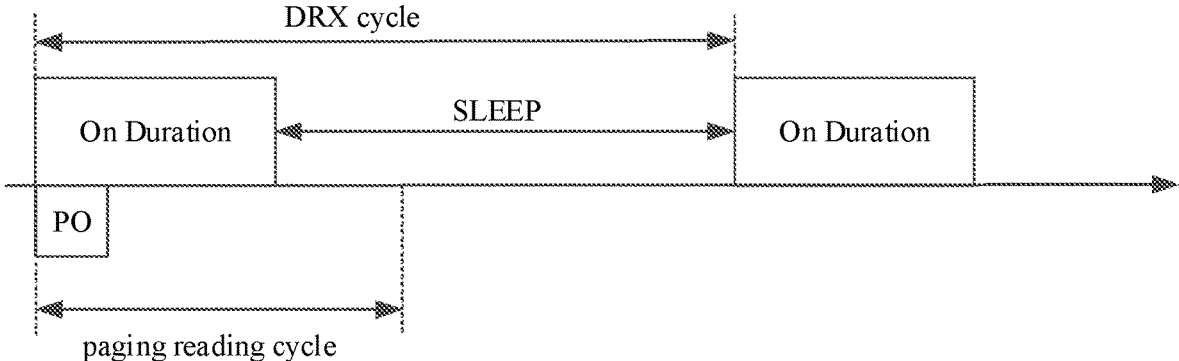
FIG. 3 illustrates a schematic diagram of an example according to an embodiment of the disclosure.

For example, when the terminal device is in the NR connected mode and in the SDT process, the PO location of paging reception may fall into a non-On-Duration of the DRX. As illustrated in FIG. 2, the PO location falls into the non-On-Duration of the DRX. At this time, the ongoing sleep of the terminal device may be interrupted, and the terminal device is woken up for paging monitoring, which may increase additional power consumption of the terminal device. However, with the method according to the embodiment of the disclosure, the PO location of the terminal device may be determined based on the location of the On-Duration, so that the PO location of the terminal device can be kept within the On-Duration as much as possible, or can be as close as possible to the location of the On-Duration, i.e., to keep the PO location to fall into the On-Duration of the DRX as much as possible, which may be as illustrated in FIG. 3. Thus, the paging reading may be executed concurrently with reception of downlink services of the terminal device, to avoid the situation of interrupting the sleep of the terminal device for monitoring, which can reduce the power consumption of the terminal device.

In the embodiment, the specific PO location for the terminal device to perform monitoring may be determined in combination with the DRX-related parameter information, which can optimize the paging reception mechanism of the connected mode, to achieve the purpose of reducing power consumption.

In order to further illustrate the specific implementation process of the method of the embodiment, the embodiment provides the specific method shown in FIG. 4. In this embodiment, for example, a current bandwidth part (BWP) of the NR connected mode supports paging reception, and DRX-related parameters are configured. In this connected mode and in the SDT process, the terminal device may not need to receive paging scheduling information, and does try to receive a short message. The method includes the following steps.

At step 201, DRX related parameter information of a terminal device is obtained.

For different types of terminal devices, the DRX-related parameter information may differ. Therefore, in order to accurately obtain the DRX related parameter information of the terminal device, in some embodiments, step 201 may include: obtaining a device type of the terminal device, and determining the DRX related parameter information corresponding to the device type.

At step 202, a location of an On-Duration in a DRX cycle is determined according to the DRX related parameter information.

In this embodiment, the location of the On-Duration in the DRX cycle may be determined according to the DRX related parameter information.

At step 203, a PO location is determined based on the location of the On-Duration and a paging reading cycle, the PO location within each paging reading cycle is located in the On-Duration, or a time distance from the PO location to the location of the On-Duration is less than a preset duration threshold.

In the embodiment of the disclosure, the paging reading cycle may also be referred to as a paging cycle.

The preset duration threshold can be pre-set according to the actual requirements, and is used to keep the PO location to be as close as possible to the location of the On-Duration even if the PO location cannot be within the On-Duration.

The terminal device performs paging monitoring during the paging reading cycle. The paging reading cycle may vary for different types of terminal devices. Therefore, in order to accurately obtain the paging reading cycle of the terminal device, in some embodiments, the method of the embodiment may further include: obtaining a device type of the terminal device, and determining a paging reading cycle corresponding to the device type.

For example, the device type of the terminal device can be classified into a terminal device that supports earthquake/tsunami alarms, and a terminal device that does not support earthquake/tsunami alarms. For the terminal device that supports the earthquake/tsunami alarms, it may perform monitoring once at any PO in cycle 1 (a paging reading cycle corresponding to this type of terminal device), in which cycle 1<=a default paging cycle. For the terminal device that does not support the earthquake/tsunami alarms, it may perform monitoring once at any PO in cycle 2 (a paging reading cycle corresponding to this type of terminal device), in which cycle 2<=a modification period. In order to facilitate the understanding of the contents of the embodiment, cycle 1 and cycle 2 may be uniformly referred to as the paging reading cycle in the embodiment, i.e., different types of terminal devices have respective corresponding paging reading cycles. In the embodiment, for the device type of the terminal device, the paging reading cycle corresponding to the device type can be determined. Thus, the determined paging reading cycle can be used as basis for accurately determined a PO location in each paging reading cycle, so that the PO location in each paging reading cycle is within the On-Duration or can be as close as possible to the location of the On-Duration, and the terminal device may execute the paging monitoring concurrently with reception of downlink services.

For example, the downlink service may be a unicast Physical Downlink Control Channel (PDCCH) receiving service.

In some embodiments, the method may further include: determining a total number of paging readings in the paging reading cycle according to a quality of a signal received by the terminal device. In this way, a suitable number of paging readings can be determined according to actual network situation, and a success rate of decoding of the paging can be improved. For example, the number X of paging readings (the following examples all take X as an example), a number of available readings in the paging reading cycle can be determined based on a current quality of a received signal, such as a Signal to Interference plus Noise Ratio (SINR), a Reference Signal Received Power (RSRP), and the like. If the signal condition is poor, in order to improve the success rate of decoding of the paging, multiple paging reading occasions may be reserved. For example, when SINR<−6 db, 2 paging reading occasions can be reserved.

In some embodiments, the paging reading cycle may be divided into two durations, which may include a first reading duration and a second reading duration. The first reading duration may be a normal reading duration, and the second reading duration may be an emergency reading duration. In the embodiment, by the configuration of the emergency reading duration, paging reading can be triggered urgently in scenarios where it cannot be performed concurrently with the reception of downlink services.

In some embodiments, the method further includes: determining a length of the second reading duration according to a default paging cycle and a PF density (radio frame density) of paging monitoring in combination with a multi-beam reception characteristic during PO reception; and determining a length of the first reading duration according to the length of the second reading duration and a total length of the paging reading cycle.

For example, a length of the emergency reading duration may be determined by a parameter N (i.e., the PF density) and the default paging cycle. For example, the default paging cycle=640 ms, N=T/2, and T represents the default paging cycle. Thus, it is determined that there are 32 radio frames containing the PO in 640 ms, i.e., there is a PO every 20 ms. 20 ms*X may be selected as an initial length of the emergency reading duration. On the basis, in combination with the multi-beam reception characteristic, by considering the effect of multi-beam trailing when receiving the PO, the length of the emergency reading duration can be enlarged appropriately. For example, based on the configuration of a search space, there is one PO exists every 1 ms, the current paging may receive beams in 8 directions, thus a reception protection time period of 8 ms may be added to the initial length of the emergency reading duration, to obtain the final length of the emergency reading duration. A length of the normal reading duration may be the remaining duration obtained by subtracting the emergency reading duration from the paging reading cycle, i.e., a sum of the length of the normal reading duration and the length of the emergency reading duration is the length of the paging reading cycle.

In some embodiments, step 203 may include: determining whether the first paging duration contains the On-Duration according to a location of the first paging duration and the location of the On-Duration; in response to the first reading duration containing the On-Duration, determining the PO location based on the location of the On-Duration contained in the first reading duration; and in response to the first reading duration not containing the On-Duration, determining the PO location based on a location of the second reading duration.

For example, determining the PO location based on the location of the On-Duration contained in the first reading duration includes: determining a radio frame for paging monitoring and determining a location of the paging monitored in the radio frame based on the location of the On-Duration contained in the first reading duration, by selecting a UE-ID.

For example, within the normal reading duration, when a downlink service is received, the calculation of the most recent PO location is triggered, and paging reception and reading is executed for X times. During the calculation of the PO location, the calculation of the radio frame that requires paging monitoring can be as Equation I:

$$(SFN + PF\_\text{offset}) \bmod T = (T \operatorname{div} N) * (UE\text{-}ID \bmod N) \qquad \text{(Equation I)}$$

In Equation I, SFN represents the radio frame for paging monitoring, PF_offset represents an offset of the radio frame, mod represents a remainder operation, T represents the default paging cycle, N represents the PF density, and UE-ID represents the selected terminal identity.

In the embodiment, based on Equation 1, the SFN, i.e., the radio frame requiring paging monitoring, that is within the On-Duration or close to the On-Duration as much as possible can be computed by selecting an appropriate UE-ID.

After determining the radio frame that requires paging monitoring, which paging is to be monitored in the radio frame may be further determined, which can be calculated as in Equation II:

$$i\_s = \text{floor}(UE\text{-}ID/N) \bmod Ns \qquad \text{(Equation II)}$$

In Equation 2, $i\_s$ represents the $i\_s^{th}$ paging to be monitored in the radio frame, N represents the PF density, floor( ) represents a downward rounding calculation, mod represents the remainder operation, and NS represents a total number of pagings in the radio frame.

In the embodiment, based on Equation 2, the SFN that is in the On-Duration or as close to the On-Duration as possible can be calculated based pm the selected UE-ID, i.e., it is determined that the $i\_s^{th}$ paging is to be monitored in the radio frame.

In the embodiment, according to the SFN that requires paging monitoring and the $i\_s^{th}$ paging to be monitored in the SFN, a corresponding PO location can be determined in accordance with certain rules. That is, the location of the On-Duration can be determined based on the DRX configuration parameters, and then the PO location can be selected by selecting the UE-ID, so as to make the PO location to be within the On-Duration or to be close to the location of the On-Duration as much as possible, which can make the paging reading to be executed concurrently with the downlink service reception as much as possible.

In some embodiments, the normal reading duration and the emergency reading duration share X paging readings. Correspondingly, after determining the PO location based on the location of the On-Duration contained in the first reading duration, the method of the embodiment may further include: determining a first number of paging readings in the first reading duration according to the PO location in the first reading duration; and in response to the first number of paging readings being less than a total number of paging readings in the paging reading cycle, determining the PO location based on the location of the second reading duration and according to a second number of paging readings, in which the second number of paging readings is obtained by subtracting the first number of paging readings from the total number of paging readings.

For example, if X paging readings are completed in the normal reading duration, the emergency reading duration does not need to carry out paging readings. If X paging readings are not completed in the normal reading duration, the emergency reading duration needs to urgently carry out paging readings for the remaining number of times.

In order to illustrate the specific implementation process of this embodiment, the following specific application examples are given, which are not limited herein.

For example, an active duration of the DRX is the On-Duration interval only, and the current number of paging readings is X=1.

When a duration of the paging reading cycle is longer than a duration of the DRX cycle, as illustrated in FIG. 5, the PO location can be determined in the On-Duration in the normal reading duration. Since the number of paging readings X=1, after determining one PO location in the normal reading duration, no paging readings is performed in the emergency reading duration, i.e., the corresponding PO is not determined in the emergency reading duration. When the second paging reading cycle arrives, the PO location is determined in the On-Duration in the normal reading duration.

Figure 6:
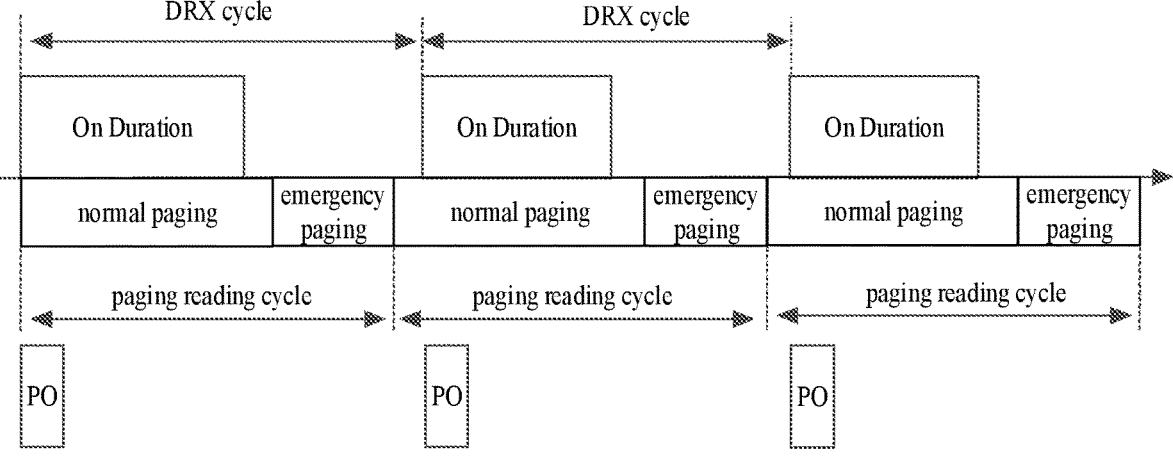
FIG. 6 illustrates a schematic diagram of an example according to an embodiment of the disclosure.

When the duration of the paging reading cycle is less than or equal to the duration of the DRX cycle, as illustrated in FIG. 6, the PO location can be determined in the On-Duration in the normal reading duration. Since the number of paging readings X=1, after determining one PO location in the normal reading duration, no paging readings is performed in the emergency reading duration, i.e., the corresponding PO may not be determined in the emergency reading duration. When the second paging reading cycle arrives, the PO location is determined in the On-Duration in the normal reading duration. Correspondingly, no paging reading is performed in the emergency reading duration. When the third paging reading cycle arrives, the PO location is determined in the On-Duration in the normal reading duration, and accordingly no paging reading is performed in the emergency reading duration.

In the above two examples, if an appropriate PO location cannot be determined in the On-Duration in the normal reading duration, the PO location may be determined in the emergency reading duration, to ensure that paging monitoring can proceed smoothly.

In the embodiment, the location of the On-Duration is determined based on the DRX configuration parameter, and the PO location is selected by selecting the UE-ID, so that the PO location can be within the On-Duration or can be close to the location of the On-Duration as much as possible, which can make the paging reading be concurrently performed with downlink unicast-pdc reception as much as possible. In a scenario where the paging reading cannot be performed concurrently with the downlink unicast-pdc reception, the emergency reading duration is set to urgently trigger a paging reading. This embodiment can optimize the paging reception mechanism of the connected mode, to achieve the purpose of reducing power consumption.

Figure 7:
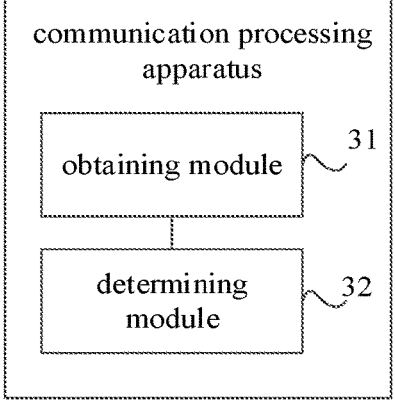
FIG. 7 illustrates a block diagram of a communication processing apparatus according to an embodiment of the disclosure.

Further, as a specific implementation of the method shown in FIGS. 1 and 4, this embodiment provides a communication processing apparatus. As illustrated in FIG. 7, the apparatus includes: an obtaining module 31 and a determining module 32.

The obtaining module 31 is configured to obtain DRX related parameter information of a terminal device.

The determining module 32 is configured to determine a location of an On-Duration in a DRX cycle according to the DRX related parameter information, and determine a PO location of the terminal device based on the location of the On-Duration.

In some examples of the embodiment, the determining module 32 is configured to determine the PO location based on the location of the On-Duration and a paging reading cycle, so that the PO location within each paging reading cycle is located in the On-Duration, or a time distance from the PO location to the location of the On-Duration is less than a preset duration threshold.

In some examples of the embodiment, the paging reading cycle includes a first reading duration and a second reading duration. Correspondingly, the determining module 32 is further configured to: determine whether the first reading duration contains the On-Duration according to a location of the first paging duration and the location of the On-Duration; in response to the first reading duration containing the On-Duration, determine the PO location based on the location of the On-Duration contained in the first reading duration; and in response to the first reading duration not containing the On-Duration, determine the PO location based on a location of the second reading duration.

In some examples of the embodiment, the determining module 32 is further configured to: determine a radio frame for paging monitoring and determining a location of a paging monitored in the radio frame based on the location of the On-Duration contained in the first reading duration and by selecting a UE-ID.

In some examples of the embodiment, the determining module 32 is further configured to: determine a first number of paging readings in the first reading duration according to the PO location in the first reading duration; and in response to the first number of paging readings being less than a total number of paging readings in the paging reading cycle, determine the PO location based on the location of the second reading duration and according to a second number of paging readings, in which the second number of paging readings is obtained by subtracting the first number of paging readings from the total number of paging readings.

In some examples of the embodiment, the determining module 32 is further configured to: determine the total number of paging readings in the paging reading cycle according to a quality of a signal received by the terminal device.

In some examples of the embodiment, the determining module 32 is further configured to: determine a length of the second reading duration according to a default paging reading cycle and a radio frame density for paging monitoring in combination with a multi-beam reception characteristic during PO reception; and determine a length of the first reading duration according to the length of the second reading duration and a total length of the paging reading cycle.

In some examples of the embodiment, the obtaining module 31 is further configured to: obtain a device type of the terminal device. The determining module 32 is further configured to: determine the paging reading cycle corresponding to the device type.

In some examples of the embodiment, the determining module 32 is further configured to: obtain the DRX related parameter information corresponding to the device type.

It is noted that other corresponding descriptions of each functional unit involved in the communication processing apparatus provided in this embodiment can be referred to the corresponding description in FIGS. 1 and 4, and will not be repeated herein.

Based on the above method shown in FIGS. 1 and 4, correspondingly, this embodiment also provides a computer-readable storage medium having computer programs stored thereon. When the computer programs are executed by a processor, the above methods shown in FIGS. 1 and 4 can be implemented.

Based on this understanding, the technical solution of the disclosure may be embodied in the form of a software product, which may be stored on a non-volatile storage medium (which may be a CD-ROM, a USB flash drive, or a mobile hard disk). It includes several instructions to cause a computer device (which may be a personal computer, a server, or a network device) to perform the methods of the various implementation scenarios of the disclosure.

Based on the above method as shown in FIGS. 1 and 4, and the virtual device embodiment shown in FIG. 7, in order to achieve the above purpose, the embodiments of the disclosure also provide an electronic device, such as a smart terminal, e.g., a smartphone, a tablet computer, a drone, an intelligent robot, which includes a storage medium and a processor. The storage medium is configured to store computer programs, and the processor is configured to execute the computer programs to implement the above method as shown in FIGS. 1 and 4. In embodiments, the storage medium stores machine-readable instructions, that when executed by the processor, cause to the processor to implement one or both of the methods of FIGS. 1 and 4.

The above-described physical device may also include a user interface, a network interface, a camera, radio frequency (RF) circuit, a sensor, an audio circuit, a WI-FI module, and the like. The user interface may include at least one of a display, an input unit (e.g., a keyboard), a USB interface, a card reader interface, and the like. The network interface may include a standard wired interface, a wireless interface (e.g., a WI-FI interface), and so on.

It will be appreciated by those skilled in the art that the above-described structure of the physical device provided by this embodiment does not constitute a limitation of the physical device, and it may include more or fewer components, a combination of certain components, or different arrangements of components.

The storage medium may also include an operating system and a network communication module. The operating system is a program that manages the hardware and software resources of the above-described physical device and supports the operation of information processing programs as well as other software and/or programs. The network communication module is configured to enable communications between components within the storage medium and other hardware and software in the information processing physical device.

Based on the above method as shown in FIGS. 1 and 4, and the virtual device embodiment shown in FIG. 7, this embodiment also provides a chip including one or more interface circuits and one or more processors. The interface circuit is configured to receive signals from a memory of an electronic device and send the signals to a processor. The signals include computer instructions stored in the memory. When the processor executes the computer instructions, it causes the electronic device to perform the above method as shown in FIGS. 1 and 4.

Through the above description of the embodiments, it is clear to those skilled in the art that the disclosure can be realized with the help of software and necessary general hardware platforms, or it can be realized by hardware. By applying the solution of the disclosure, compared with the related art, the embodiment can make the PO location of the terminal device to be within the On-Duration or to be close to the On-Duration as much as possible, i.e., falling into the On-Duration of the DRX as much as possible, and thus the paging reading can be executed concurrently with the reception of downlink services of the terminal device, which can avoid interrupting the ongoing sleep of the terminal device for monitoring, and can reduce the power consumption of the terminal device.

It should be noted that, in this disclosure, relational terms such as "first" and "second" are used only to distinguish one entity or operation from another, and do not necessarily require or imply the existence of any such actual relation or sequence between those entities or operations. The terms "including", "comprising", or any other variant thereof, are intended to cover non-exclusive inclusion, so that a process, method, article or apparatus comprising a set of elements includes not only those elements, but also other elements that are not expressly enumerated, or elements that are inherent to such process, method, article or apparatus. Without further limitation, the fact that an element is defined by the phrase "including a . . . " does not exclude the existence of another identical element in the process, method, article or apparatus that includes the element.

The foregoing are only specific embodiments of the disclosure to enable those skilled in the art to understand or realize the disclosure. Various modifications to these embodiments will be apparent to those skilled in the art, and the general principles defined herein may be realized in other embodiments without departing from the spirit or scope of the disclosure. Therefore, the disclosure will not be limited to these embodiments described herein, but will be subject to the broadest scope consistent with the principles and novel features applied for herein.

What is claimed is:

1. A communication processing method, comprising:
   obtaining discontinuous reception (DRX) related parameter information of a terminal device;
   determining a location of an On-Duration in a DRX cycle according to the DRX related parameter information; and
   determining a paging occasion (PO) location of the terminal device based on the location of the On-Duration;
   wherein determining the PO location of the terminal device based on the location of the On-Duration comprises:
   determining the PO location based on the location of the On-Duration and a paging reading cycle, wherein the PO location within each paging reading cycle is located in the On-Duration, or a time distance from the PO location to the location of the On-Duration is less than a preset duration threshold;
   wherein the paging reading cycle comprises a first reading duration and a second reading duration, and determining the PO location based on the location of the On-Duration and the paging reading cycle comprises:
   determining whether the first reading duration contains the On-Duration according to a location of the first reading duration and the location of the On-Duration;
   determining that the first reading duration contains the On-Duration, and determining the PO location based on the location of the On-Duration contained in the first reading duration; and
   determining that the first reading duration does not contain the On-Duration, and determining the PO location based on a location of the second reading duration.

2. The method of claim 1, wherein determining the PO location based on the location of the On-Duration contained in the first reading duration comprises:
   determining a radio frame for paging monitoring and determining a location of a paging monitored in the radio frame based on the location of the On-Duration contained in the first reading duration, by selecting a user equipment identity (UE-ID).

3. The method of claim 1, wherein the method further comprises:

determining a first number of paging readings in the first reading duration according to the PO location in the first reading duration; and determining that the first number of paging readings is less than a total number of paging readings in the paging reading cycle, and determining the PO location based on the location of the second reading duration and a second number of paging readings, wherein the second number of paging readings is obtained by subtracting the first number of paging readings from the total number of paging readings.

4. The method of claim 3, further comprising:

determining the total number of paging readings in the paging reading cycle according to a quality of a signal received by the terminal device.

5. The method of claim 1, further comprising:

determining a length of the second reading duration according to a default paging reading cycle, a radio frame density for paging monitoring, and a multi-beam reception characteristic during PO reception; and determining a length of the first reading duration according to the length of the second reading duration and a total length of the paging reading cycle.

6. The method of claim 1, further comprising:

obtaining a device type of the terminal device; and determining the paging reading cycle corresponding to the device type.

7. The method of claim 6, wherein obtaining the DRX related parameter information of the terminal device comprises:

obtaining the DRX related parameter information corresponding to the device type.

8. A non-transitory computer-readable storage medium storing machine-readable instructions that, when executed by a processor, cause the processor to:

obtain discontinuous reception (DRX) related parameter information of a terminal device;

determine a location of an On-Duration in a DRX cycle according to the DRX related parameter information; and determine a paging occasion (PO) location of the terminal device based on the location of the On-Duration;

wherein the storage medium further storing machine-readable instructions that, when executed by the processor, cause the processor to:

determine the PO location based on the location of the On-Duration and a paging reading cycle, wherein the PO location within each paging reading cycle is located in the On-Duration, or a time distance from the PO location to the location of the On-Duration is less than a preset duration threshold;

wherein the paging reading cycle comprises a first reading duration and a second reading duration, and the storage medium further storing machine-readable instructions that, when executed by the processor, cause the processor to:

determine whether the first reading duration contains the On-Duration according to a location of the first reading duration and the location of the On-Duration;

determine that the first reading duration contains the On-Duration, and determine the PO location based on the location of the On-Duration contained in the first reading duration; and determine that the first reading duration does not contain the On-Duration, and determine the PO location based on a location of the second reading duration.

9. An electronic device, comprising a processor and a storage medium storing machine-readable instructions that, when executed by the processor, cause the processor to:

obtain discontinuous reception (DRX) related parameter information of a terminal device;

determine a location of an On-Duration in a DRX cycle according to the DRX related parameter information; and determine a paging occasion (PO) location of the terminal device based on the location of the On-Duration;

wherein the storage medium further storing machine-readable instructions that, when executed by the processor, cause the processor:

determine the PO location based on the location of the On-Duration and a paging reading cycle, wherein the PO location within each paging reading cycle is located in the On-Duration, or a time distance from the PO location to the location of the On-Duration is less than a preset duration threshold;

wherein the paging reading cycle comprises a first reading duration and a second reading duration, and the storage medium further stores machine-readable instructions that, when executed by the processor, cause the processor to:

determine whether the first reading duration contains the On-Duration according to a location of the first reading duration and the location of the On-Duration;

determine that the first reading duration contains the On-Duration, and determine the PO location based on the location of the On-Duration contained in the first reading duration; and determine that the first reading duration does not contain the On-Duration, and determine the PO location based on a location of the second reading duration.

10. The electronic device of claim 9, the storage medium further storing machine-readable instructions that, when executed by the processor, cause the processor to:

determine a radio frame for paging monitoring and determine a location of a paging monitored in the radio frame based on the location of the On-Duration contained in the first reading duration, by selecting a user equipment identity (UE-ID).

11. The electronic device of claim 9, the storage medium further storing machine-readable instructions that, when executed by the processor, cause the processor to:

determine a first number of paging readings in the first reading duration according to the PO location in the first reading duration; and determine that the first number of paging readings is less than a total number of paging readings in the paging reading cycle, and determine the PO location based on the location of the second reading duration and a second number of paging readings, wherein the second number of paging readings is obtained by subtracting the first number of paging readings from the total number of paging readings.

12. The electronic device of claim 11, the storage medium further storing machine-readable instructions that, when executed by the processor, cause the processor to:

determine the total number of paging readings in the paging reading cycle according to a quality of a signal received by the terminal device.

13. The electronic device of claim 9, the storage medium further storing machine-readable instructions that, when executed by the processor, cause the processor to:

determine a length of the second reading duration according to a default paging reading cycle, a radio frame density for paging monitoring, and a multi-beam reception characteristic during PO reception; and determine a length of the first reading duration according to the length of the second reading duration and a total length of the paging reading cycle.

14. The electronic device of claim 9, the storage medium further storing machine-readable instructions that, when executed by the processor, cause the processor to:

obtain a device type of the terminal device; and determine the paging reading cycle corresponding to the device type.

15. The electronic device of claim 14, the storage medium further storing machine-readable instructions that, when executed by the processor, cause the processor to:

obtain the DRX related parameter information corresponding to the device type.

* * * * *